United States Patent Office 3,557,074
Patented Jan. 19, 1971

3,557,074
PRODUCTION OF LOW MOLECULAR WEIGHT
WAXY POLYETHYLENES
Oskar Buechner and Wolfgang Immel, Ludwigshafen (Rhine), Helmut Pfannmueller, Limburgerhof, Pfalz, Georg Schmidt-Thomee, Heidelberg, and Friedrich Urban, Limburgerhof, Pfalz, Germany, assignors to Badische Anilin- & Soda-Fabrik Aktiengesellschaft, Ludwigshafen (Rhine), Germany
No Drawing. Filed May 3, 1968, Ser. No. 726,562
Claims priority, application Germany, May 6, 1967, 1,720,273
Int. Cl. C08f 1/60, 3/04
U.S. Cl. 260—94.9         7 Claims

ABSTRACT OF THE DISCLOSURE

A process for the production of low molecular weight waxy polyethylenes by polymerization of ethylene at elevated temperature and superatmospheric pressure by means of free-radical initiators. The course of the polymerization is influenced by adding (a) hydrogen or an alkane and (b) an alkene.

---

The present invention relates to a process for the production of low molecular weight waxy polyethylenes (hereinafter called "polyethylene waxes" for short) by direct polymerization of ethylene.

According to prior art methods of this type, polyethylene waxes are obtained some properties of which are unsatisfactory. The main reason for this is that when one or more desired properties are improved, which can in fact be done, one more other desired properties are as a result impaired. This phenomenon is particularly pronounced in the case of the following pairs of properties: (1) a fall in the molecular weight, i.e. a desired decrease in the melt viscosity, is accompanied by an undesirable decrease in hardness, and vice versa; (2) a desired increase in the softening range is accompanied by an undesirable decrease in the oil-binding property, and vice versa; (3) a desired increase in the hardness results in an undesirable decrease in the oil-binding property, and vice versa.

Thus it is known from U.S. Patent Specifications Nos. 2,153,553, 2,188,465 and 2,219,684 that polyethylene waxes can be prepared by polymerization of ethylene at pressures of at least 500 atmospheres, temperatures of from 100° to 400° C. and with oxygen as initiator. In order to obtain polyethylene waxes having the desired low molecular weight of 2000 to 10,000 it is necessary to use relatively low pressures, i.e. from 500 to 1000 atmospheres, and relatively large amounts of oxygen; the waxes formed are soft and unctuous. Moreover the last-mentioned polymerization conditions are near to the range in which explosive decomposition of ethylene takes place.

It is known from U.S. patent specification No. 2,387,755 that the production of polyethylene waxes may be carried out in the presence of hydrogen; while it is true that the molecular weight of the polymers decreases with increasing concentration of hydrogen, the softening range and the hardness are also lowered.

Finally the method of U.S. patent specification No. 2,999,856 results in a "compromise" of the properties; in the polymerization of ethylene in the presence of 10 to 15% by volume of hydrogen, at temperatures of 150° C. to 180° C. and pressures of from 300 to 500 atmospheres using di-tertiary-butyl peroxide as initiator, a polyethylene wax is obtained having a softening range of 106° to 109° C. and a melt viscosity of 400 to 2000 centistokes. A disadvantage of this wax is that the softening range is relatively high and this makes it more difficult to process the wax for example in the polish, printing ink and packaging industries (a wax having a softening range of from 100° to 106° C. would be desirable). The mediocre hardness of the wax (penetrometer value 1 to 3, measured according to ASTM D 5–25, 100 g./5 sec./25° C.; 0.1 mm. penetration depth=1) is a disadvantage; moreover it can only be attained by forcing up the softening range. Furthermore the oil-binding property of the wax is unsatisfactory, i.e. the wax has poor absorptive power for organic solvents and readily releases them again under pressure.

The present invention has for its object to provide a process which permits the production of polyethylene wax in which not only do the softening range and the melt viscosity lie in the desired ranges (100° to 106° C. and 200 to 2000 centistokes) but which also has a good hardness (penetrometer values 1 to 2, measured according to ASTM D 5–25, 100 g./5 sec./25° C.; 0.1 mm. depth of penetration=1) and good oil-binding properties.

We have found that the said object can be achieved in a process for the production of low molecular weight waxy polyethylene in which ethylene is polymerized at a temperature of from 200° to 300° C., preferably from 220° to 270° C., and pressures of 1200 to 2500, preferably from 1200 to 1800, atmospheres by means of free-radical initiators.

The process according to this invention comprises the use of an ethylene which contains:

(a) 10 to 30% by volume (with reference to the ethylene) of hydrogen or a $C_2$–$C_4$ alkane and
(b) 0.5 to 3%, preferably 1 to 2%, by volume (with reference to the ethylene) of a $C_3$–$C_4$ alkene.

Examples of suitable components (a), apart from hydrogen, for carrying out the process according to this invention are ethane, propane, butane, isobutane and mixtures of these substances. Hydrogen and propane are particularly suitable. When choosing the amounts of these substances regard should be had to the fact that relatively small amounts of the substances result in polyethylene waxes having relatively high molecular weights whereas relatively large amounts result in polyethylene waxes having relatively low molecular weights.

Examples of suitable components (b) for carrying out the process according to this invention are propene, butene-(1), butene-(2), isobutylene and mixtures of these substances. Propene is particularly suitable.

Within the said limits, the process according to this invention may be carried out under conventional conditions. For example it is possible to carry it out continuously in an autoclave or a tubular reactor; ethylene not reacted in the polymerization can be recycled to the process after the polymer has been separated. Recycling the ethylene under approximately the same pressure as that prevailing in the polymerization chamber has proved to be particularly advantageous as regards conversion and economy. Further improvement in conversion may be achieved in known manner, for example by supplying cold ethylene, with or without fresh initiator, to various points of the reaction chamber (in this connection see for example the published papers of British Patent No. 933,235).

Polymerization in the process according to this invention is effected by means of free-radical initiators. Conventional free-radical initators may be used, for example oxygen, tertiary-butyl peroxyacetate, tertiary-butyl peroxypivalate, dilauroyl peroxide, benzoyl peroxide, ditertiary-butyl peroxide and mixtures of these initiators. Oxygen is particularly suitable. The amount of initiator is also within the conventional range; for example in the case of oxygen it is advantageously from 0.5 mole to 2 moles of initiator per mole of ethylene to be polymerized. It should be taken into consideration that in the case of a relatively active component (a) and/or a relatively high operating pressure, relatively small amounts of initiator should be used, and vice versa.

The invention is illustrated by the following examples:

EXAMPLES 1 TO 5

Ethylene is polymerized under the conditions set out in the table below in a conventional tubular reactor for the polymerization of ethylene. Polyethylene waxes are obtained whose properties are also set out in the table. In the table the column headed "0" is a comparative example, the pressures are given in atmospheres, the temperatures in °C., the melt viscosity in centistokes at 120° C. and the percentages are by volume. The penetrometer values are determined in the manner given in the description.

TABLE

| | Examples | | | | | |
|---|---|---|---|---|---|---|
| | 0 | 1 | 2 | 3 | 4 | 5 |
| Pressure | 1,500 | 1,500 | 1,500 | 1,350 | 1,650 | 1,700 |
| Temperature | 260 | 255 | 260 | 245 | 270 | 270 |
| Component (a) $H_2$ percent | 15.2 | 14.1 | | | 14.0 | 13.3 |
| Component (a) propane percent | | | 19.0 | 18.5 | | |
| Component (b) propene percent | | 1.0 | 1.5 | 1.5 | | 1.6 |
| Component (b) isobutylene percent | | | | | 2.0 | |
| $O_2$ percent | 0.12 | 0.11 | 0.13 | | 0.09 | 0.08 |
| Dilauroyl peroxide p.p.m. wiight | | | | 52 | | |
| Melt viscosity | 970 | 950 | 990 | 1050 | 960 | 970 |
| Softening point | 115 | 103 | 104 | 105 | 104 | 102 |
| Penetrometer vlaue | 1.0 | 1.0 | 1.0 | 1.5 | 1.0 | 1.5 |
| Oil-binding property | Bad | Good | Good | Good | Good | Good |

We claim:

1. A process for the production of low molecular weight waxy polyethylenes having a softening range of 100° to 106° C., a melt viscosity of 200 to 2000° centistokes, a penetrometer value of 1 to 2 (measured according to ASTM D 5–25, 100 g./5 sec./25° C.; 0.1 mm. depth of penetration=1) and good oil-binding properties by polymerization of ethylene at a temperature of 200° to 300° C. and at a pressure of from 1200 to 2500 atmospheres by means of a free-radical initiator, wherein the ethylene used contains (a) 10 to 30% by volume, with reference to the ethylene, of hydrogen or propane and
   (b) 0.5 to 3% by volume, with reference to the ethylene, of propene.

2. A process as claimed in claim 1 wherein polymerization is carried out at from 220° to 270° C.

3. A process as claimed in claim 2 wherein said polymerization is carried out at 1200–1800 atmospheres and at 220–270° C. and wherein component (a) is hydrogen.

4. A process as claimed in claim 1 wherein polymerization is carried out at a pressure of from 1200 to 1800 atmospheres.

5. A process as claimed in claim 1 wherein component (a) is hydrogen.

6. A process as claimed in claim 1 wherein the initiator used is oxygen.

7. A process as claimed in claim 1 wherein 0.5 mole to 2 moles of initiator is used per mole of ethylene to be polymerized.

References Cited

UNITED STATES PATENTS

| 2,999,856 | 9/1961 | Bestian et al. | 260—94.9 |
| 3,129,212 | 4/1964 | Mortimer | 260—94.9 |
| 3,274,167 | 9/1966 | Doak et al. | 260—88.2 |

FOREIGN PATENTS

| 971,627 | 9/1964 | Great Britain. |

OTHER REFERENCES

Raff et al., Crystalline Olefin Polymers, Part I, Interscience Publishers, N.Y., pp. 287, 288 and 327 (1965).

JOSEPH L. SCHOFER, Primary Examiner

E. J. SMITH, Assistant Examiner